United States Patent
Norbeck, Jr. et al.

(10) Patent No.: US 10,511,540 B1
(45) Date of Patent: Dec. 17, 2019

(54) SYSTEMS AND METHODS OF PREDICTIVE DISPLAY OF CLOUD OFFERINGS BASED ON REAL-TIME INFRASTRUCTURE DATA CONFIGURATIONS

(71) Applicant: VCE Company, LLC, Richardson, TX (US)

(72) Inventors: Donald E. Norbeck, Jr., Lafayette Hill, PA (US); Kendrick A. Coleman, Louisville, KY (US); Joshua C. Atwell, Apex, NC (US); James A. Ellers, Portland, OR (US); Ryan J. Andersen, Belmont, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 242 days.

(21) Appl. No.: 14/579,258

(22) Filed: Dec. 22, 2014

(51) Int. Cl.
*H04L 12/911* (2013.01)
*G06N 5/04* (2006.01)

(52) U.S. Cl.
CPC .......... *H04L 47/788* (2013.01); *G06N 5/048* (2013.01)

(58) Field of Classification Search
CPC . G06F 9/5072; G06F 8/65; G06F 9/50; H04L 47/788; H04L 67/1008; H04L 67/1012; H04L 67/1029; H04L 67/1004; H04L 47/827; H04L 67/10; H04L 67/16; H04L 41/14; H04L 41/0853; H04L 41/0823; G06Q 30/0206; G06N 5/048
See application file for complete search history.

(56) References Cited

U.S. PATENT DOCUMENTS

| | | | | |
|---|---|---|---|---|
| 6,587,833 | B1* | 7/2003 | Ruffin | G06Q 10/06 705/7.22 |
| 2010/0250746 | A1* | 9/2010 | Murase | G06F 9/50 709/226 |
| 2012/0102187 | A1* | 4/2012 | Bargoti | G06F 3/061 709/224 |
| 2012/0131176 | A1* | 5/2012 | Ferris | G06F 9/5072 709/224 |
| 2012/0137002 | A1* | 5/2012 | Ferris | G06F 9/5072 709/226 |
| 2012/0137003 | A1* | 5/2012 | Ferris | H04W 4/003 709/226 |
| 2012/0179824 | A1* | 7/2012 | Jackson | G06F 9/5027 709/226 |
| 2012/0254433 | A1* | 10/2012 | Gujral | G06F 9/5072 709/226 |
| 2013/0205027 | A1* | 8/2013 | Abuelsaad | G06F 9/5072 709/226 |

(Continued)

OTHER PUBLICATIONS

Cloud computing, Wikipedia, Dec. 20, 2014. (Year: 2014).*
Scalability, Wikipedia, Dec. 17, 2014. (Year: 2014).*
Software as a service, Wikipedia, Dec. 18, 2014. (Year: 2014).*

*Primary Examiner* — Vivek Srivastava
*Assistant Examiner* — Muhammad Raza
(74) *Attorney, Agent, or Firm* — Polsinelli PC

(57) ABSTRACT

Aspects of the present disclosure involve system and methods for the automatic prediction and offering of cloud computing services to end users. The disclosed systems generate a predictive cloud service offering that is presented to end users via an interface, such as a graphical-user interface. The predictive cloud services may be consumed by the end-users to support various workloads.

6 Claims, 7 Drawing Sheets

(56) References Cited

U.S. PATENT DOCUMENTS

| | | | |
|---|---|---|---|
| 2013/0311988 A1* | 11/2013 | Boss | G06F 9/4862 718/1 |
| 2013/0339947 A1* | 12/2013 | Neary | G06F 9/45558 718/1 |
| 2013/0346572 A1* | 12/2013 | Jain | G06F 9/5088 709/223 |
| 2014/0006609 A1* | 1/2014 | Gay | H04L 43/0876 709/224 |
| 2014/0059232 A1* | 2/2014 | Plattner | H04L 67/1029 709/226 |
| 2014/0278808 A1* | 9/2014 | Iyoob | G06Q 30/0206 705/7.35 |
| 2015/0088586 A1* | 3/2015 | Pavlas | G06F 9/45558 705/7.25 |
| 2015/0106512 A1* | 4/2015 | Cama | H04L 43/0876 709/224 |
| 2015/0142940 A1* | 5/2015 | McMurry | H04L 67/16 709/223 |
| 2016/0055496 A1* | 2/2016 | Goldberg | G06Q 30/0202 705/7.31 |
| 2016/0094483 A1* | 3/2016 | Johnston | H04L 47/827 709/226 |
| 2017/0017655 A1* | 1/2017 | Pinto | G06F 8/33 |

* cited by examiner

US 10,511,540 B1

SYSTEMS AND METHODS OF PREDICTIVE DISPLAY OF CLOUD OFFERINGS BASED ON REAL-TIME INFRASTRUCTURE DATA CONFIGURATIONS

TECHNICAL FIELD

Aspects of the present disclosure involve the allocation and provisioning of cloud computing services.

BACKGROUND

Cloud computing represents a type of computing that relies on allocating and sharing computing resources in the form of one or more services to requesting applications over a network such as the Internet. The allocation of services may be driven by performance predictions, such as predicting future workloads for currently existing cloud services, as well as new cloud services that have not yet been allocated. Predicting workloads enables system managers to engage in more efficient management and optimization of computing resources across physical, virtual and cloud environments to deliver cloud services to end users. For example, predicting and analyzing workloads enables system managers to more efficiently allocate, provision, and deploy cloud services and resources, enforce load balancing and security policies on such services and resources, and validate quality-of-service end-user requirements offered to end users. As workloads increase in complexity and demand higher performance capabilities, providing the cloud services necessary to support such workloads has become both labor-intensive and time consuming.

SUMMARY

Aspects of the present disclosure include systems, methods, and/or non-transitory computer readable mediums for provisioning a computing component. The systems include processors and/or computing devices that execute the methods and/or instructions of the non-transitory computer readable mediums. The methods and/or instructions of the non-transitory computer readable mediums include obtaining contextual information corresponding to a workload supported by a first set of cloud services currently deployed in a cloud. The methods and/or instructions of the non-transitory computer readable mediums further include processing, the contextual information to identify a second set of cloud services capable of supporting the workload, wherein the second set of cloud services supports the workload and wherein the second set of cloud services includes at least one cloud service not included in the first set of cloud services. The methods and/or instructions of the non-transitory computer readable mediums include receiving a selection of at least one cloud service from the second set of cloud services and provisioning the selection of the at least one cloud service to support the workload.

BRIEF DESCRIPTION OF THE DRAWINGS

The foregoing and other objects, features, and advantages of the present disclosure set forth herein should be apparent from the following description of particular embodiments of those concepts, as illustrated in the accompanying drawings. The drawings depict only typical embodiments of the present disclosure and, therefore, are not to be considered limiting in scope.

DETAILED DESCRIPTION

Figure 1:
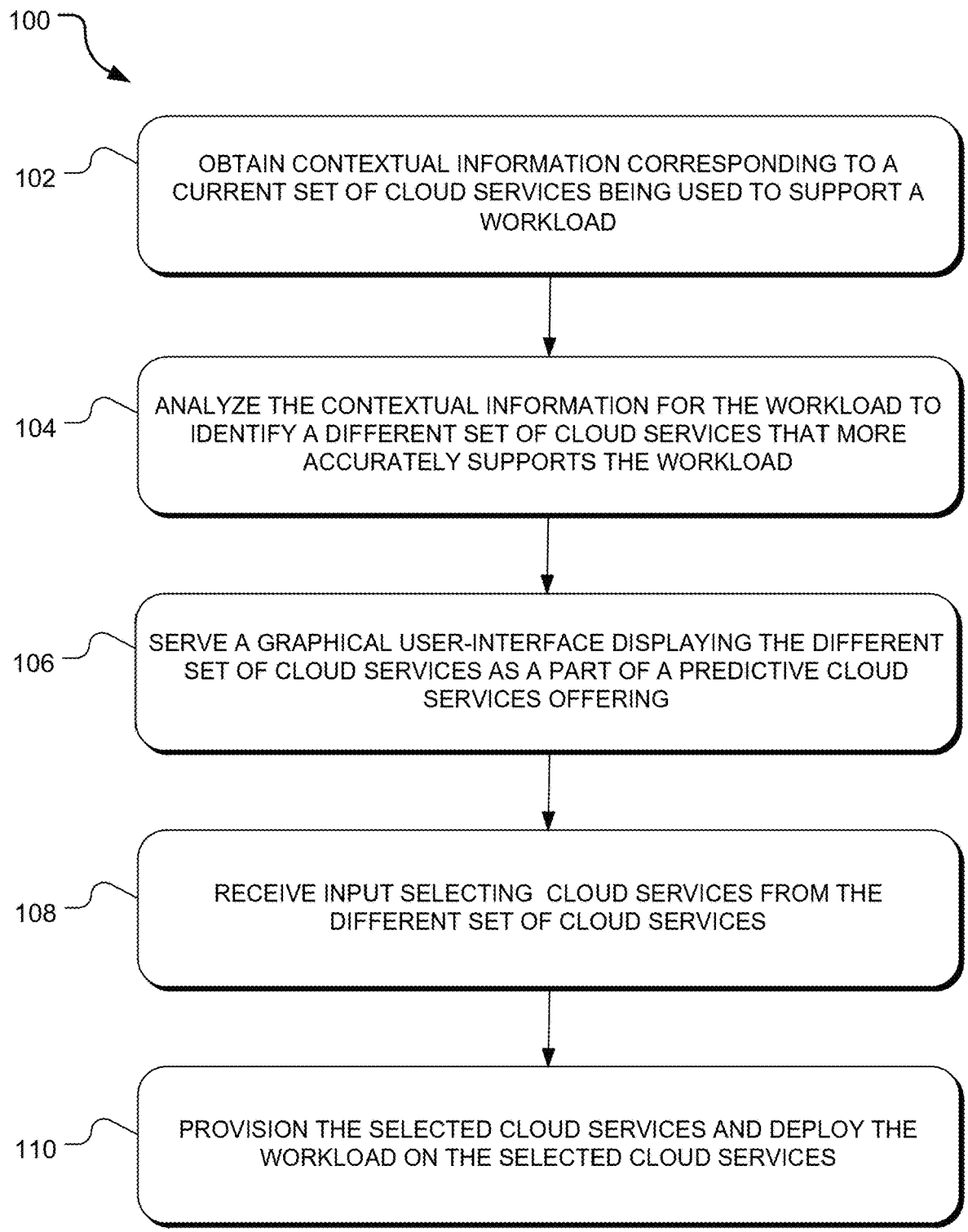
FIG. 1 is a flow chart for predicting cloud services, according to aspects of the present disclosure.

Aspects of the present disclosure are directed to the automatic prediction and offering of cloud computing services to end users. In various aspects, the disclosed systems may generate one or more interactive graphical user-interfaces that enable the identification of an end user and the display of contextual and predictive offerings of cloud computing services to the identified user. Contextual aspects and/or information corresponding to the end user's existing set of cloud services, such as existing workloads and/or workload preferences, current performance capabilities, configurations, etc., may be continuously obtained by the system and subsequently analyzed to generate the cloud services predictions offered to the end user. Based on the selection of one or more of the displayed cloud service offerings, the system may automatically generate additional cloud services offering(s), or modify existing cloud services offerings, and/or the like, to ensure that the offered cloud services can support the existing workloads deployed on the cloud services or support workloads intended to be deployed on the cloud services.

Generally speaking, cloud computing represents a specific type of computing paradigm used to build, manage, secure, and consume information technology in a manner that makes both public and private computing resources (e.g., applications, servers, storages, and/or networks) flexible, dynamic, and available on demand. Cloud services represent independent computing resources that are provided by the cloud (e.g., over a network) in the form of a service that may be accessed and consumed by end users. Cloud services satisfy the cloud computing paradigm in that each cloud service is designed to provide easy and scalable access to multiple applications, servers, data storage, end users, etc. Example cloud services include online data storage and backup solutions, Web-based e-mail services, hosted office suites, database processing, managed technical support services, computing infrastructures, among others. Cloud service implementations are often complex, spanning components located on end user clients, backend servers, as well as a variety of networks.

End users consume cloud services to support end-user applications. In a typical arrangement, an end-user application may be supported by several workloads distributed across several cloud services. In the cloud computing context, a "workload" refers to the requirements and characteristics of an independent application or other piece of code that may be hosted in the cloud and executed by a set of cloud services. A typical workload will have a series of constraints, such as real-time performance, configuration, utilization, cost, and/or end-user preferences.

For example, presume that an end user "A" is searching for a set of cloud services to implement and support a Microsoft Exchange™ e-mail application for two different groups of users: 1) employees of a Wall Street trading firm that require a 24/7 access to a highly secure e-mail system capable of securely transmitting e-mails and instant messages over long distance and outside the training firms private network; and 2) employees involved in a manufacturing facility that send a very limited number of instant messages and e-mail primarily internally an end user will often be an IT (Information Technology) person tasked with setting up the e-mail services. The "workload" (referred to herein as "workload E") refers all of the discrete, individual capabilities and processes required for the e-mail application to function properly and support each set of users as a complete e-mail application. The constraints for the workload E may include security constraints to ensure that any e-mails, particularly for the Wall Street Firm employees, are highly secure. Workload constraints for the manufacturing users may involve cost constraints because the users are only using the e-mail in limited amounts. The end user A may consume various compute, network, and storage cloud services to support the workload E.

Aspects of the present disclosure involve the presentation of one or more cloud services to an end user based on contextual aspects and/or information related to a current set of cloud services the end user is consuming to support various current workload(s) of an application already deployed on the current set of cloud services and/or a new workload(s) intended to be deployed on the current set of cloud services, as well as other information corresponding to the end user. Stated differently, the disclosed systems automatically predicts or otherwise generates, based on the contextual information, a new set of cloud services that optimizes execution of the existing workload(s) already deployed on the current set of cloud services and/or modifies the existing set of cloud services and presents the predicted set of cloud services in the form of a predictive cloud service to the end user.

Figure 2A:
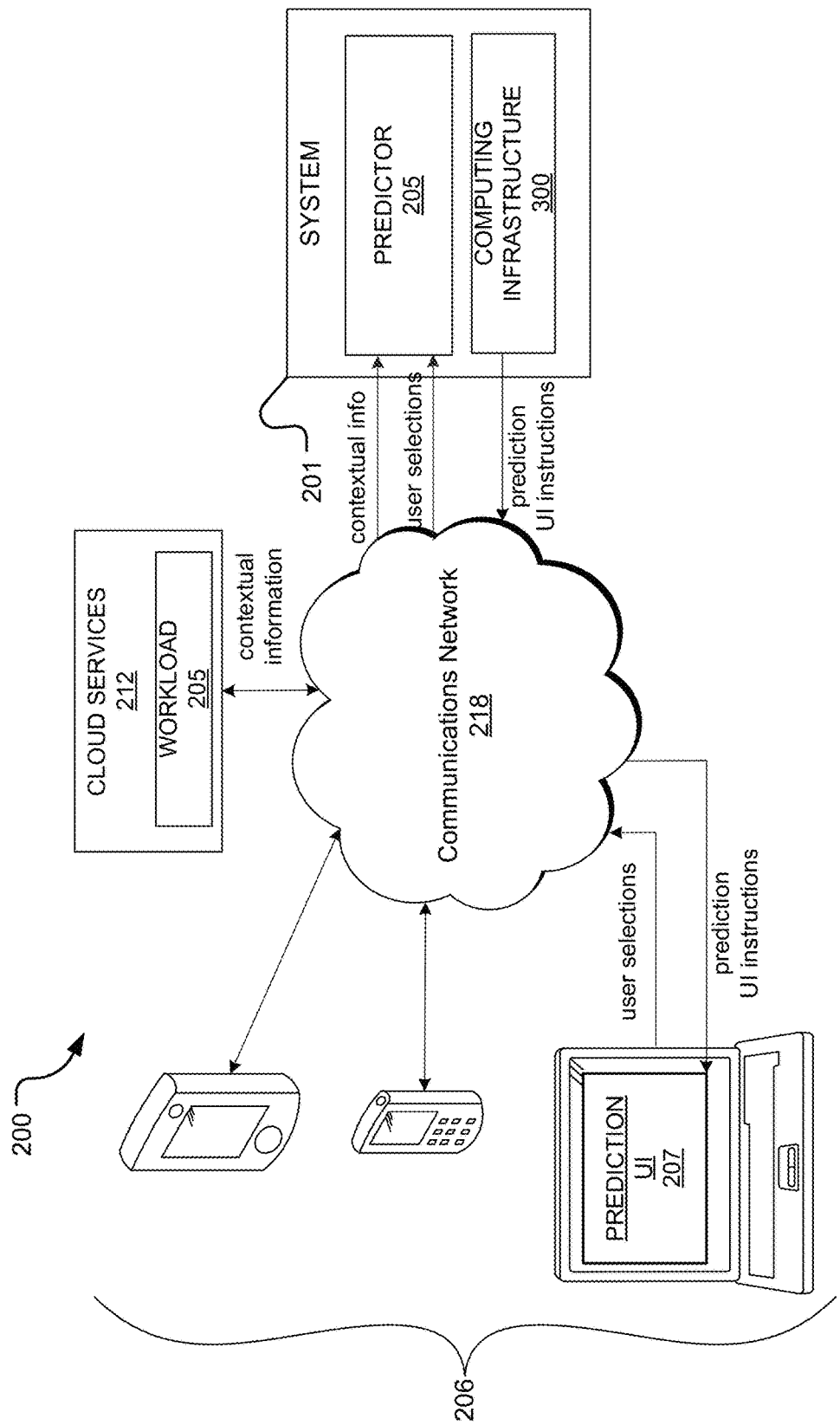
FIG. 2A is block diagram illustrating a computing environment for predicting cloud services, according to aspects of the present disclosure.
Figure 2B:
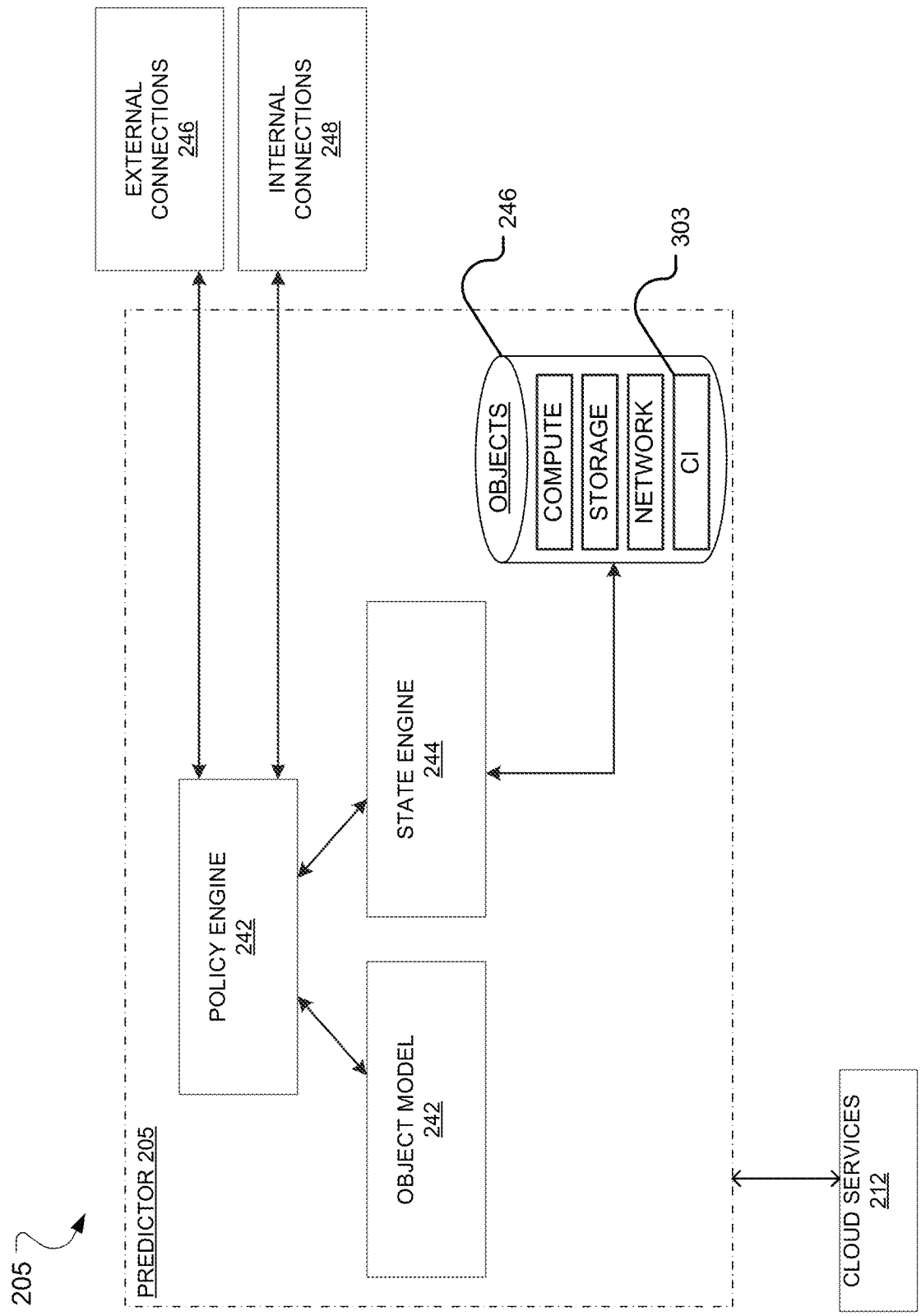
FIG. 2B is a block diagram illustrating a computing infrastructure object, according to aspects of the present disclosure.

An illustrative process and system for predicting a set of cloud services for presentation to an end user are depicted in FIGS. 1 and 2A-B, respectively. In particular, FIG. 1 illustrates an example process 100 for providing one or more interactive graphical user-interfaces capable of displaying predictive cloud services offerings to end users. FIGS. 2A and 2B illustrate a computing architecture 200 including hardware and/or software components that may be used to perform or otherwise execute the process 100 of FIG. 1. More specifically, FIG. 2A illustrates a computing environment 200 including a system 201 configured to generate and serve the one or more interfaces that enables an end user to select various cloud services that the end user intends to consume to support the end user's applications and workloads. FIG. 2B illustrates an example embodiment of a computing environment 200, which represents one possible specific type of predicted cloud service offering presented by the system 201 to end users for selection.

Referring now to FIG. 1, process 100 begins with obtaining contextual information corresponding to a current set of cloud services being used to support a workload (operation 102). In particular, the system 201 may monitor a workload 205 currently deployed on a set of cloud services 212 to obtain contextual information that articulates how efficiently the cloud services are able to execute and/or otherwise perform the workload 205. For example and in one embodiment, the contextual information may include information such as real-time utilization, performance, configuration, availability, security, and end user-preferences of the workload 205. While illustrated in one box of FIG. 2, it should be illustrated cloud services 212 may be distributed across different devices (e.g., servers, storage and network components) and distributed throughout the communications network 218, which may be the Internet, an intranet, a local area network, a wireless local network, a wide area network, or another communication network, as well as combinations of networks.

For example and in one embodiment, the system 201 may obtain contextual information that includes daily, weekly, monthly, and/or yearly patterns in the utilization of the cloud services 212 associated with the workload 205. Referring to the Microsoft Exchange™ e-mail example, the contextual information may identify that workload E (i.e. of the e-mail application) has peak usage in the late afternoon because Wall Street users tend access the e-mail at a high volume before stock markets close for the day. As another example, the contextual information may identify that the workload E may be impacted by high volume during certain times of the year (e.g., a holiday season), caused by a surge in manufacturing sales.

In other embodiments, the contextual information may include data that may aid in determining the amount of computing resources available for workloads to execute on and the amount of resources a workload is likely to consume. Referring to the Microsoft Exchange™ e-mail example, contextual information may indicate that the workload E is deployed and running on a current set of cloud services and in accordance with any constraints is utilizing 80% of processor capacity, 20% of memory capacity, 40% of input/output device capacity, and 5% of disk storage capacity at a particular date and time.

Referring again to FIG. 1, the collected contextual information is analyzed to predict or otherwise identify a different combination or entirely new set of cloud services that may optimize support of the workload and any workload constraints of the workload (operation 104) relative to the services being consumed. As illustrated in FIG. 2A, a predictor 205 analyzes the contextual information corresponding to the workload 205 to predict the new and/or modified set of cloud services.

FIG. 2B provides an illustration of the predictor 205, according to one embodiment. As illustrated, the predictor 205 includes a state engine 240 that provides the centralized and automated logic, which when executed predicts and/or otherwise generates the set of cloud services offerings that may be used to support and/or execute workloads of an end-user. The state engine 240 is dynamically driven by an object model 242 that defines the inter-relationships of one or more objects 246 stored in the predictor 205. An object represents an independently functioning, atomic level, computing resource that may be provided to an end user in the form of a consumable cloud service. For example, an object may be an individual component computing component such as a blade, storage array, server, processor, chassis, or other type of compute, network, and/or storage computing resource. Accordingly, the object model is used to standardize the mapping of defined to specific configurations.

In one specific implementation, a single object may include other objects. For example, an object may include the required compute, network, and storage components required to define a computing infrastructure ("CI") (illustrated in FIG. 2B as CI 300), such as a converged infrastructure. Generally speaking, converged infrastructures refer to computing systems implemented in a virtual computing environment that includes a structured combination of multiple virtual objects that are executed on independently functioning hardware resources commonly referred to as hosts. Distributed computing systems implemented in a virtual computing environment may be advantageous in that they are dynamically configurable to continually adapt to ever changing requirements typically exhibited by modern distributed computing systems. The computing components of a converged infrastructure solution may include servers, data storage components, networking equipment and software for managing the integrated components. To assist in the scalability, management and sharing of resources, particularly in large data center environments, converged infrastructures may involve a pool of servers, storage and networking capacities, typically virtualized, that can shared by multiple applications.

Figure 3:
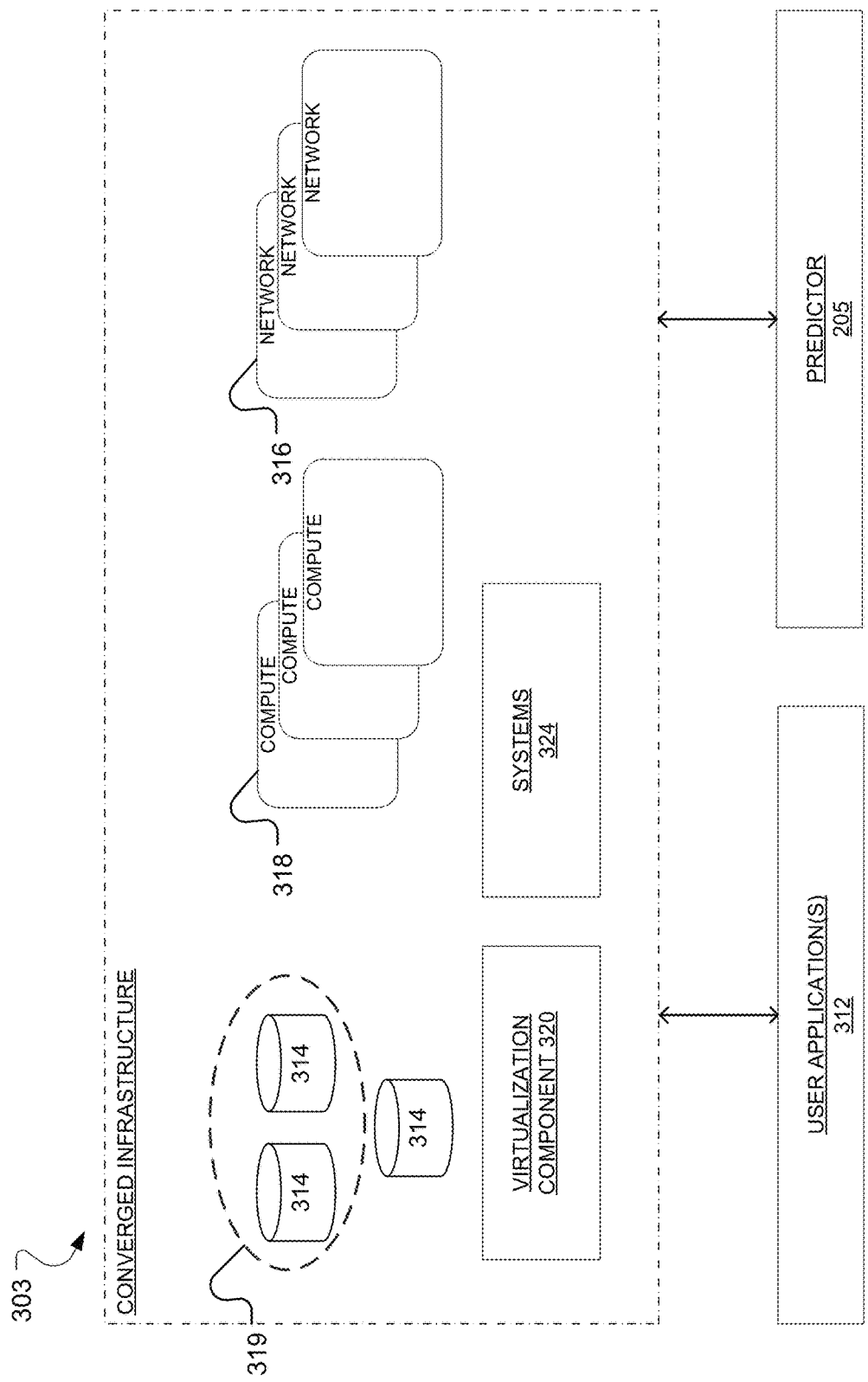
FIG. 3 is a block diagram of a computing architecture, according to aspects of the present disclosure.

FIG. 3 is an illustration of a CI 300 that may be defined as an individual object in the objects 246, according to one embodiment. As illustrated, the computing infrastructure 300 includes a set of modular and configurable computing components, including one or more storage components 314 to provide data storage and/or data management capabilities; one or more network components 316 to provide network connectivity; one or more compute components 318 to provide processing capacity; a virtualization component 320, such as a hypervisor, to host virtual environments (e.g., virtual operating systems and applications); and various other systems 324 included within the computing infrastructure 303. The components are provided to, or otherwise accessed by, a user application 312 that requires varying levels of storage, network, compute, and/or virtualization resources. In one possible specific implementation, the computing infrastructure 303 may be a Vblock™ Systems converged infrastructure.

In yet another embodiment, an object may be an abstraction of a group of other individual objects. For example and with reference to FIGS. 2B and 3, the object model 249 of may include a storage pool object 319 that abstracts one or more storage components of the computing infrastructure 300 into the storage pool 319 object.

The relationship between the object model 242 and the state engine 244 is mapped in a policy engine 242 that includes one or more defined policies (not shown) that are executed to ensure that any workload constraints, such as any rules of consumption, configuration, performance, cost, compliance, security, and/or provisioning of a cloud services offering generated by the predictor 205 is validated and enforced. Referring to the Microsoft Exchange™ e-mail example, assume that the e-mail application and system includes two e-mail servers: an active primary e-mail server and a backup e-mail server. In order to ensure that one of the two e-mail servers is always up and running for the Wall Street users, the primary e-mail server and the backup e-mail server cannot be running on or otherwise consuming the same set of compute and storage cloud services. To ensure such an arrangement occurs, the policy engine 242 may include an anti-affinity rule "R" that states "in order to maintain 99.999% e-mail server availability, a predictive cloud services offering must be constructed by using at least objects (e.g., data stores) that are more than 90 km from each other when provisioning and/or configuring the e-mail servers". Such a policy ensures that the state engine 244 does not generate any cloud service offering that would deploy the active primary e-mail server and the backup e-mail server on, for example, the same data store and processing cloud services. The policies included in the policy engine 242 may be applied to both static cloud services offerings made available to an end user for consumption, or to cloud service offerings that already being consumed and in use.

According to one embodiment, the policy engine 242 may interact or otherwise communicate with one or more external connections 246 that provide public cloud computing offerings and/or other computing service offerings to validate the generation of a cloud service offering. In particular, the predictor 205 may initiate one or more application program interface (API) call to the external connections 246. For example, assume that the predictive cloud service offering requires the configuration of a virtual machine object that is generated by accessing the Amazon ServiceNow™ service catalog, which is a computing platform that is separate and distinct from the predictor 205. To ensure that the predictor 205 is authorized to access the Amazon system and generates the virtual machine object as part of a cloud service offering, the predictor 205 may initiate an API call that includes authentication information to validate that the predictor 205 can access the Amazon ServiceNow™ service catalog. In another embodiment, the policy engine 242 may also interact with one or more internal connections 248 that provide private cloud computing offerings and/or other computing service offerings to generate and/or validate a cloud service offering. The predictor 205 interacts with the one or more internal connections 248 in in the same or similar manner as with the one or more external connections 246.

In another embodiment, the policy engine 242 may interact or otherwise communicate with one or more external connections 246 that provide public cloud computing offerings and/or other computing service offerings for use in the generation of a predictive cloud service offering.

The state engine 244, during execution, identifies one or more objects from the objects 246 and dynamically generates a predictive cloud service offering that is in compliance with the policies included in the policy engine 242. Referring to the Microsoft Exchange™ e-mail example, the state engine 242 may identify an individual storage object, such as a data store, and an individual compute object, such as processor, to support both the primary e-mail server and the backup e-mail server. Additionally, the state engine 242 may reconcile the identified objects (i.e., the storage object and compute object) with policy "R," stored in the policy engine 242, to ensure that the objects included in the cloud services offering are properly provisioned and/or configured.

Figure 4A:
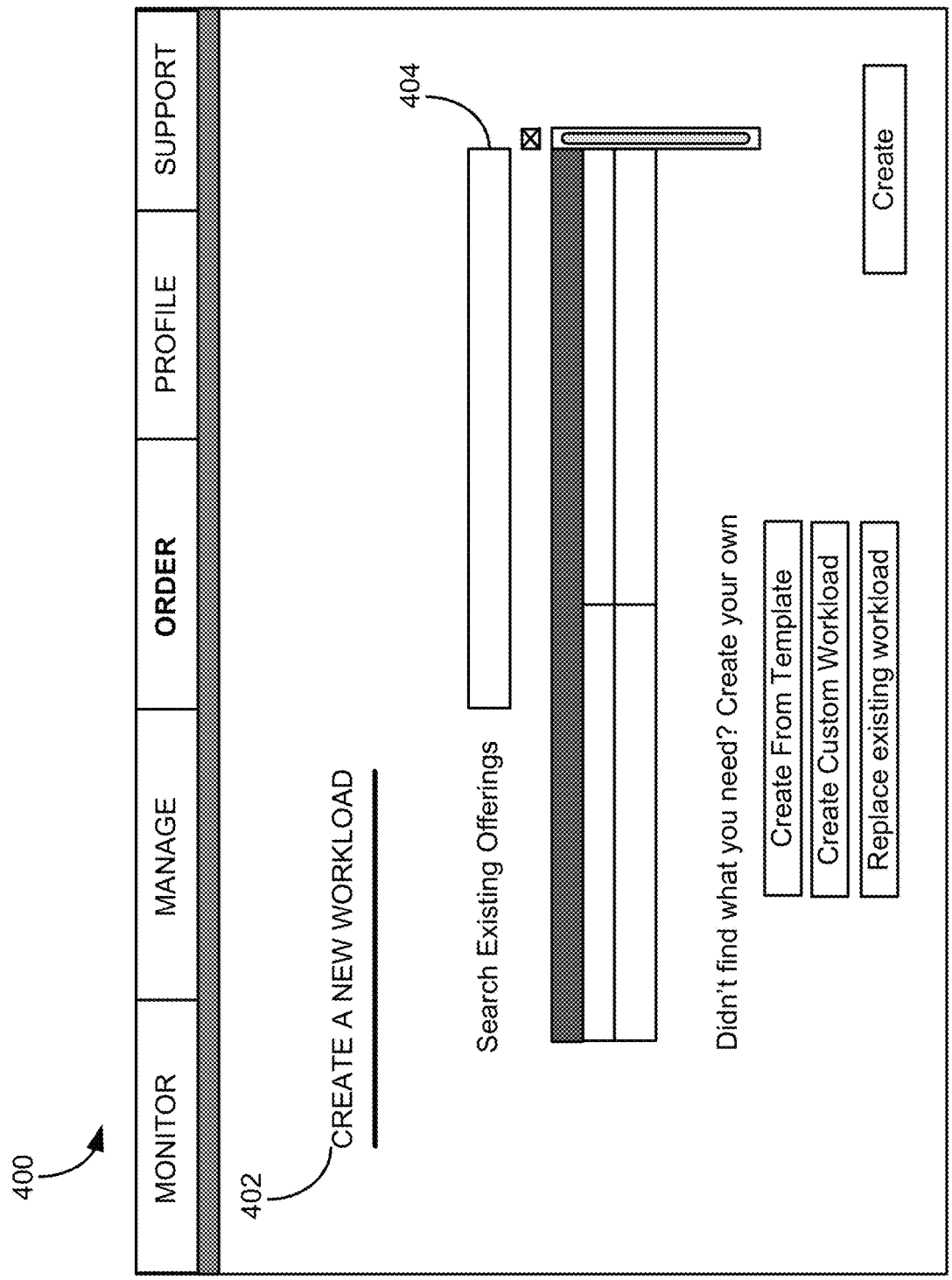
FIG. 4A-4B illustrates a sequence of screen shots of interfaces, according to aspects of the present disclosure.
Figure 4B:
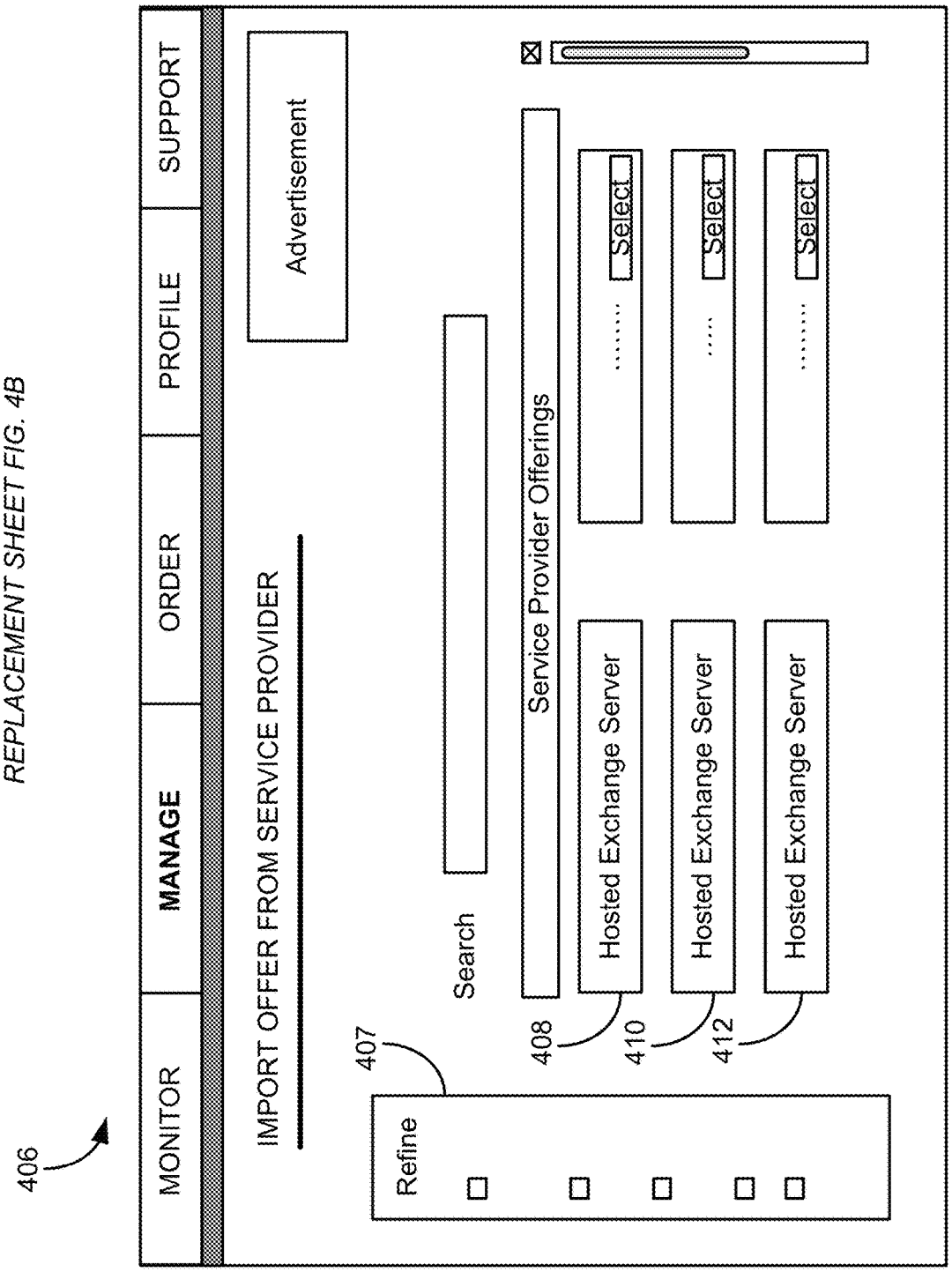

Referring again to FIG. 1, the identified different and/or new set of cloud services are served and displayed to end-users, in the form of a predictive cloud services offering, using one or more interactive interfaces/input forms (e.g. a user-interface or graphical user-interface (GUI)) (operation 106). In particular, the system 201 provides a mechanism, such as a prediction GUI 207, that displays predictive cloud services offerings to one or more user devices 206. In response, end users may select or identify specific cloud services of the predictive cloud service offerings required to support the workload (operation 108). The user-interfaces, displaying the predictive cloud services offerings may be used to enable end users to engage in a dynamic dialog, to select, identify, and/or otherwise obtain the appropriate cloud services required to support a given workload. FIG. 4 is an illustration of an example GUI 400 that may be generated by the system 201, according to one embodiment. As illustrated, a user may interact with the GUI 400 to create a new workload 402, or select an existing workload 404, for which the predictor 205 may generate one or more predictive cloud services offerings. FIG. 4B provides an illustration of a GUI 406 that may be generated by the system 201 in response to an identified workload. As illustrated, the GUI 406 includes one or more initial cloud services offerings 408, 410, and 412 generated by the predictor 205. An end user may interact with the GUI 406 and begin selecting and filtering through various aspects of the cloud services offerings 408, 410, and 412 to select certain cloud computing services that could be provisioned, configured and deployed to support the workload. In the illustrated embodiment, the user may select any one of such filterable aspects 407, such as infrastructure, compliance, location, availability, costs, and/or application. In response to the selections, the state engine 244 of the predictor 205 may generate additional and/or modified predictive cloud service offerings in real-time and continuously, based on both the input of the user and any obtained contextual information, eventually settling upon a smaller number of available choices.

Once the end user selects the desired cloud services from the displayed predictive cloud services offerings, the selected cloud services are provisioned and/or configured and the workloads are deployed (operation 110). When the set of cloud services offering involves modifications to an already existing set of cloud services, the system 201 automatically reconfigures the existing cloud services for the workload. Alternatively, when the set of cloud services are a new set of cloud services, the system 201 automatically provisions the new set of cloud services to support the workload. The configured and/or provisioned cloud services are fully functional, live and running, and capable of supporting the various workloads of the end users.

Figure 5:
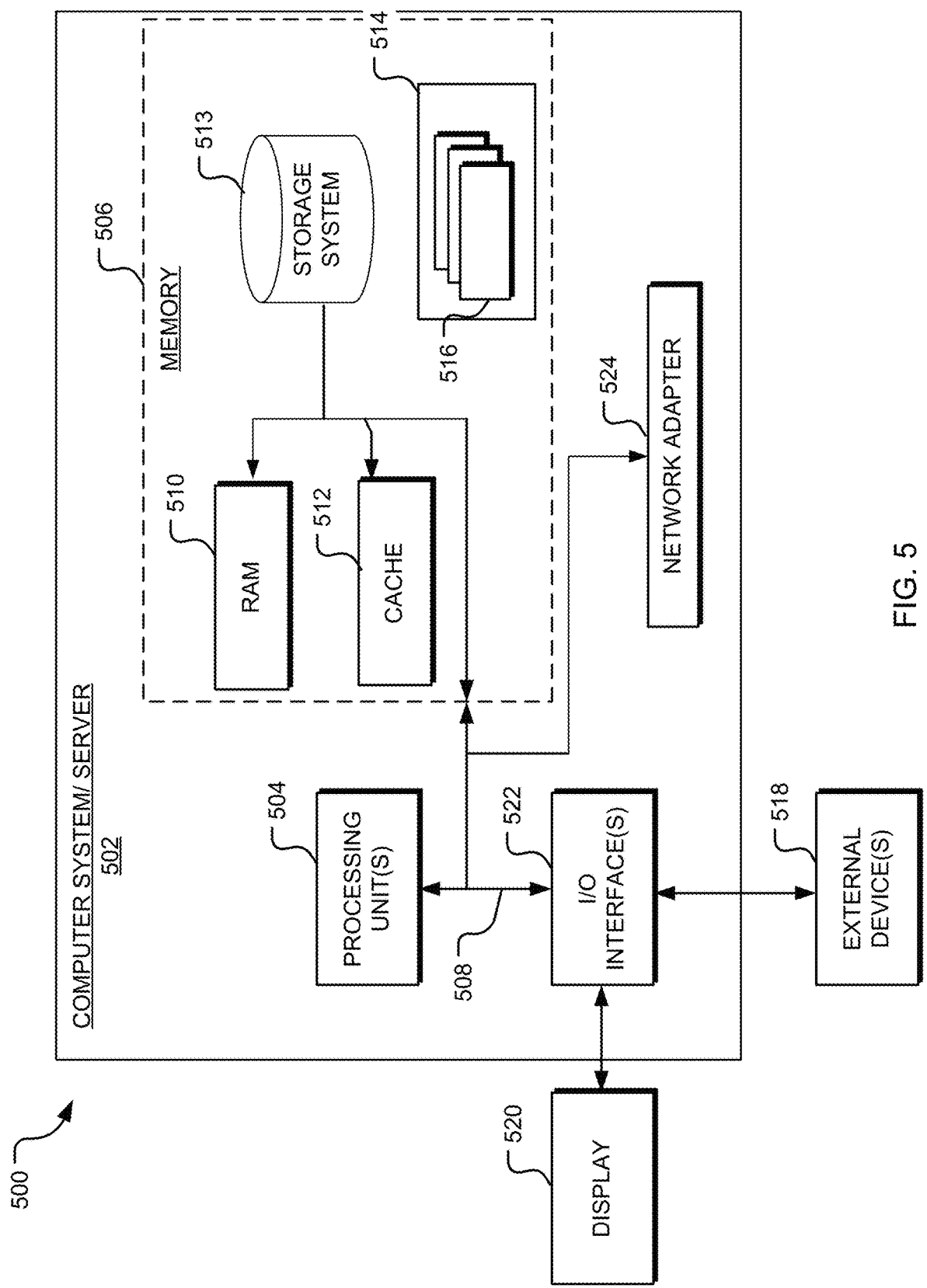
FIG. 5 is an illustration of a computing device, according to aspects of the present disclosure.

FIG. 5 illustrates an example of a computing node 500 which may comprise an implementation of the system 201. The computing node 500 represents one example of a suitable computing device and is not intended to suggest any limitation as to the scope of use or functionality of embodiments of the invention described herein. Regardless, the computing node 500 is capable of being implemented and/or performing any of the functionality described above.

As illustrated, the computer node 500 includes a computer system/server 502, which is operational with numerous other general purpose or special purpose computing system environments or configurations. Examples of well-known computing systems, environments, and/or configurations that may be suitable for use with computer system/server 502 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 may include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed:

1. A method for provisioning a computing component, the method comprising:

obtaining, using one or more computing devices, contextual information corresponding to a workload comprising at least one application executed on a first set of cloud services currently being consumed to support an end user workload, wherein the first set of cloud services are deployed in a cloud computing network and the contextual information comprises:

one or more configurations of computing resources associated with the first set of cloud services;

one or more end user preferences of the end user workload; and performance information corresponding to an execution of at least one application on the computing resources associated with the first set of cloud services;

communicating with one or more cloud service providers to obtain one or more available cloud service objects from the one or more cloud service providers;

analyzing, using the one or more computing devices, the contextual information to determine a predictive second set of cloud services generated from the one or more available cloud service objects of the one or more cloud service providers, wherein the predictive second set of cloud services includes at least one converged computing infrastructure object comprising a plurality of individual ones of the available cloud service objects of the one or more cloud service providers each modeling a physical computing resource capable of performing the end user workload, wherein the predictive second set of cloud services includes at least one cloud service not included in the first set of cloud services, wherein analyzing the contextual information comprises:

identifying at least one policy defining one or more constraints of and corresponding to the one or more available cloud service objects, the one or more constraints including at least one of real-time utilization, performance, configuration, availability, security, and end user-preference requirements of the workload; and executing the at least one policy to validate that the predictive second set of cloud services satisfies the one or more constraints;

generating one or more graphical user-interfaces for displaying the predictive second set of cloud services to an end user associated with the end user workload;

receiving, via the one or more graphical user-interfaces, a selection from the end user of at least one new cloud service from the predictive second set of cloud services, the at least one new cloud service comprising at least one cloud computing resource;

provisioning within the cloud computing network, in response to the received selection from the end user via the one or more graphical user-interfaces and using the one or more computing devices, the at least one new cloud service to support the end user workload by reconfiguring the cloud computing network; and receiving input for filtering the predictive second set of cloud services based on constraints corresponding to the workload; and in response to the filtering, providing a third set of cloud services for display via the one or more graphical user-interfaces.

2. The method of claim 1, wherein the one or more available cloud service objects corresponds to one of a blade, server, storage array, or a processor.

3. A system for provisioning a computing component, the system comprising:

one or more computing devices each comprising:

a network adapter for communicating with one or more cloud computing services over a communication network;

a processing device; and a non-transitory computer-readable medium connected to the processing device configured to store information and instructions that, when executed by the processing device, causes the one or more computing devices to:

obtain contextual information corresponding to a workload comprising at least one application executed on a first set of cloud services currently being consumed to support an end user workload, wherein the first set of cloud services are deployed in a cloud computing network and the contextual information comprises:

one or more configurations of computing resources associated with the first set of cloud services;

one or more end user preferences of the end user workload; and performance information corresponding to an execution of at least one application on computing resources associated with the first set of cloud services;

communicate with one or more cloud service providers to obtain one or more available cloud service objects from the one or more cloud service providers;

analyze the contextual information to determine a predictive second set of cloud services generated from the one or more available cloud service objects of the one or more cloud service providers, wherein the predictive second set of cloud services includes at least one converged computing infrastructure object comprising a plurality of individual ones of the available cloud service objects of the one or more cloud service providers each modeling a physical computing resource capable of performing the end user workload, wherein the predictive second set of cloud services includes at least one cloud service not included in the first set of cloud services, wherein analyzing the contextual information comprises:

identifying at least one policy defining one or more constraints of and corresponding to the one or more available cloud service objects, the one or more constraints including at least one of real-time utilization, performance, configuration, availability, security, and end user-preference requirements of the workload; and executing the at least one policy to validate that the predictive second set of cloud services satisfies the one or more constraints;

generate one or more graphical user-interfaces for displaying the predictive second set of cloud services to an end user associated with the end user workload;

receive, via the one or more graphical user-interfaces, a selection from the end user of at least one new cloud service from the predictive second set of cloud services, the at least one new cloud service comprising at least one cloud computing resource;

provision within the cloud computing network, in response to the received selection from the end user via the one or more graphical user-interfaces and using the one or more computing devices, the at least one new cloud service to support the end user workload by reconfiguring the cloud computing network;

receive input for filtering the predictive second set of cloud services based on constraints corresponding to the workload; and in response to the filtering, provide a third set of cloud services for display via the one or more graphical user-interfaces.

4. The system of claim 3, wherein the contextual information includes at least one of real-time utilization, performance, configuration, availability, security, and end user-preferences constraints of the workload.

5. A non-transitory computer-readable medium including instructions for provisioning computing services, the instructions executable by a processor to cause the processor to perform the operations of:

obtaining contextual information corresponding to a workload comprising at least one application executed on a first set of cloud services currently being consumed to support an end user workload, wherein the first set of cloud services are deployed in a cloud computing network and the contextual information comprises:

one or more configurations of computing resources associated with the first set of cloud services;

one or more end user preferences of the end user workload; and performance information corresponding to an execution of at least one application on computing resources associated with the first set of cloud services;

communicating with one or more cloud service providers to obtain one or more available cloud service objects from the one or more cloud service providers;

analyzing the contextual information to determine a predictive second set of cloud services generated from the one or more available cloud service objects of the one or more cloud service providers, wherein the predictive second set of cloud services includes at least one converged computing infrastructure object comprising a plurality of individual ones of the available cloud service objects of the one or more cloud service providers each modeling a physical computing resource capable of performing the end user workload, wherein the predictive second set of cloud services includes at least one cloud service not included in the first set of cloud services, wherein analyzing the contextual information comprises:

identifying at least one policy defining one or more constraints of and corresponding to the one or more available cloud service objects, the one or more constraints including at least one of real-time utilization, performance, configuration, availability, security, and end user-preference requirements of the workload; and executing the at least one policy to validate that the predictive second set of cloud services satisfies the one or more constraints;

generating one or more graphical user-interfaces for displaying the predictive second set of cloud services to an end user associated with the end user workload;

receiving, via the one or more graphical user-interfaces and from the end user, a selection of at least one new cloud service from the predictive second set of cloud services, the at least one new cloud service comprising at least one cloud computing resource;

provisioning within the cloud computing network, in response to the received selection from the end user via the one or more graphical user-interfaces and using the one or more computing devices, the at least one new cloud service to support the end user workload by reconfiguring the cloud computing network;

receiving input for filtering the predictive second set of cloud services based on constraints corresponding to the workload; and in response to the filtering, providing a third set of cloud services for display via the one or more graphical user-interfaces.

6. The non-transitory computer-readable medium of claim 5, wherein the one or more available cloud service objects corresponds to one of a blade, server, storage array, or a processor.

* * * * *